(No Model.)

W. C. VAJEN.
REIN SUPPORT.

No. 414,849. Patented Nov. 12, 1889.

WITNESSES.
H. Dean Rhodes
J. Walsh

INVENTOR.
Willis C. Vajen,
per E. W. Bradford,
ATTORNEYS.

UNITED STATES PATENT OFFICE.

WILLIS C. VAJEN, OF INDIANAPOLIS, INDIANA.

REIN-SUPPORT.

SPECIFICATION forming part of Letters Patent No. 414,849, dated November 12, 1889.

Application filed July 16, 1889. Serial No. 317,670. (No model.)

*To all whom it may concern:*

Be it known that I, WILLIS C. VAJEN, a citizen of the United States, residing at Indianapolis, in the county of Marion and State of Indiana, have invented certain new and useful Improvements in Rein-Supports, of which the following is a specification.

The principal object of my said invention is to provide a means whereby reins of harness may be held up and prevented from sagging and at the same time be permitted the usual freedom of motion as the horse's head is turned from side to side. This object is accomplished by securing to the back-strap of the harness, preferably at about the point where the breeching-straps and crupper are attached thereto, a device similar to a form of buckle-frame, passing a strap or cord loosely through this frame, and attaching the ends of said strap or cord to the reins at a point in advance of where the frame is attached to the harness.

Said invention principally consists in the combination, with the harness and reins, of a strap or cord attached in this manner.

It further consists in certain details of construction, all as will hereinafter be more particularly described and claimed.

Figure 1:
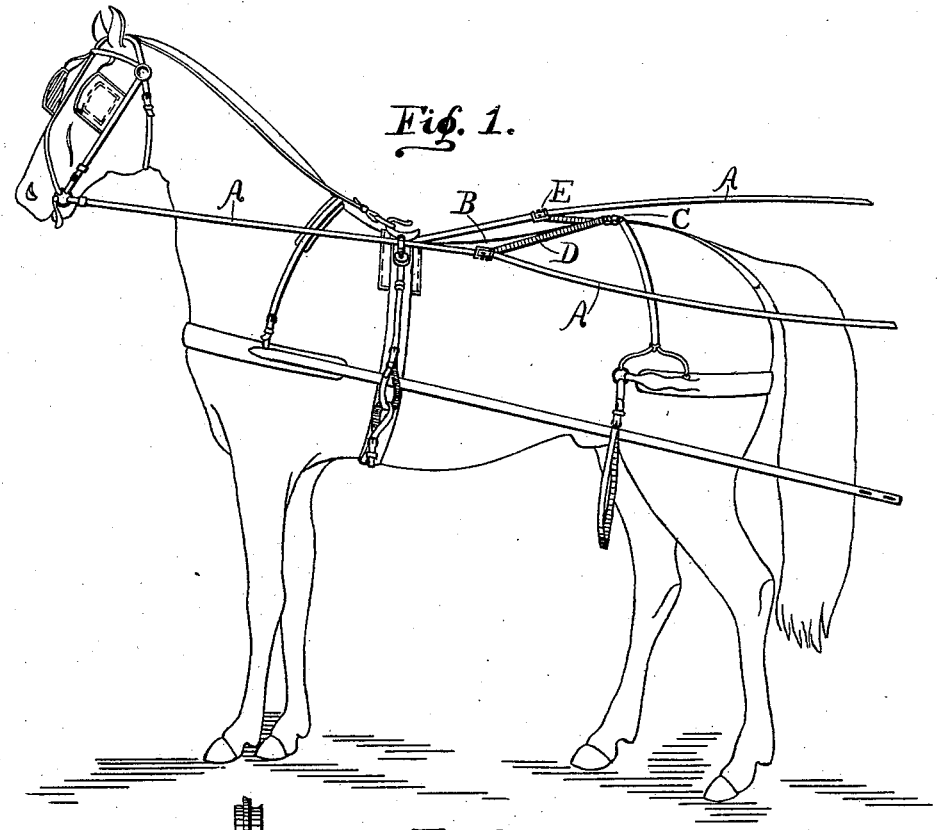
Figure 2:
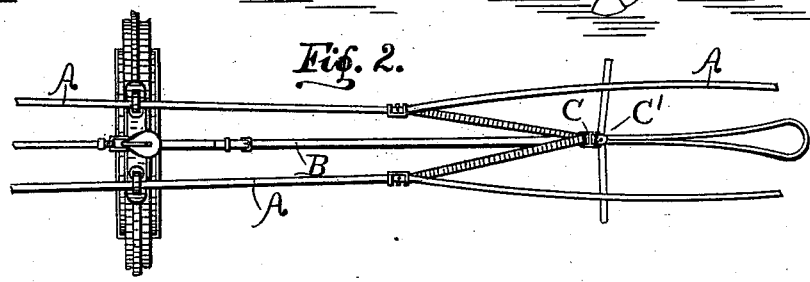
Figure 3:
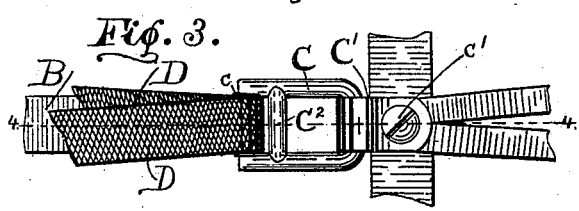
Figure 5:
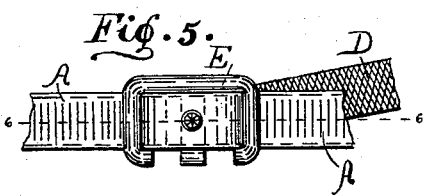
Figure 4:
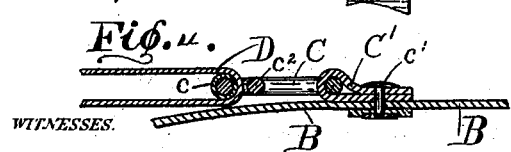
Figure 6:

Referring to the accompanying drawings, which are made a part hereof, and on which similar letters of reference indicate similar parts, Figure 1 is a view of a horse in harness with my said invention attached to the harness; Fig. 2, a top or plan view of the device embodying my said invention and the adjacent portions of the harness; Fig. 3, a top or plan view of the frame through which the strap, which is the leading feature of my invention, passes, and fragments of said strap and of the portions of harness to which it is attached, on an enlarged scale; Fig. 4, a central sectional view on the dotted line 4 4 in Fig. 3; Fig. 5, a plan view of a preferable form of buckle by which to attach the end of said strap to the reins, and Fig. 6 a central sectional view of the same.

In said drawings the portions marked A represent the reins of the harness; B, the back-strap thereto; C, the buckle-like frame through which the strap or cord of my invention passes; D, said strap or cord, and E the buckles by which the ends of said strap or cord are secured to the reins.

The reins A and back-strap B are or may be of the usual or any desired form.

The frame C is similar to the frame of a variety of buckles. It is preferably secured to the back-strap B by a leather loop C' and a rivet or screw-stud $c'$. Its free end is in the form of a straight bar, which preferably has a sleeve or roller $c$ thereon, which serves as an anti-friction sheave or roller, around which the strap D runs. Behind it is another transverse bar $c^2$, which is preferably only a sufficient distance from the one around which the strap passes to permit said strap to pass through freely. This leaves a narrow slit only sufficient for the accommodation of the strap, and prevents said strap from becoming twisted. The form of this slit or opening would of course be changed if the form of the strap should be made different.

The strap D is passed through the slit or opening in the frame C, as shown and just described, and extends forward, and is attached to each of the two reins, as shown. This strap is preferably a piece of elastic webbing, so that when the horse desires to lower his head in order to drink or for any other reason, he may do so without this device being unbuckled. This is also preferable because with an elastic strap of not too great stiffness a slight pull can always be maintained upon the reins, similar to that caused by the holding of said reins by the driver in ordinary driving, notwithstanding that the reins may be left loose so far as the driver is concerned.

Instead of a flat strap, as shown, a round cord may be used, or a flat or round otherwise non-elastic strap with a spring as the elastic portion.

The buckles E may be any ordinary buckles suitable for the purpose. I prefer, however, a special construction, such as shown, having open sides, so that the device may be placed upon the reins when in position and removed therefrom at pleasure, as this permits the device to be readily placed upon any harness without any other permanent attachment than simply attaching the frame C to the back-strap by riveting or otherwise, the remainder being easily attached or removed at any time in a few moments.

It is well known in the ordinary management of horses in driving that it is difficult to keep the reins from dropping down in front and frequently becoming caught under the front ends of the shafts, and sometimes becoming entangled in other ways. By the use of my invention this difficulty is entirely obviated and the lines are kept up in proper position at all times, while there is no interference with the ordinary manipulation of the reins.

Having thus fully described my said invention, what I claim as new, and desire to secure by Letters Patent, is—

1. The combination, with a harness and the reins thereof, of a frame secured to said harness at a point to the rear of the saddle or girth, and a strap passing loosely through said frame and attached to said reins at a point in advance of said frame, whereby the forward portions of said reins are supported.

2. The combination, with a harness and the driving-reins thereof, of a loop or frame secured to said harness, and a flexible elastic strap passing loosely through said frame or loop and from said frame or loop to said reins, to which its ends are attached, substantially as set forth.

3. The combination, with a harness, of a frame-like part C, attached thereto and provided with an anti-friction sheave or roller, a strap passing through said frame over said roller and attached at the ends to the reins at a point in advance of said frame.

4. The combination of a harness, a frame-like portion C, attached thereto in the rear of the harness-saddle or girth, a strap passing through said frame and attached at the ends to the reins by means of buckles E, having open sides whereby the attachment and detachment of the device may be readily effected, substantially as set forth.

In witness whereof I have hereunto set my hand and seal, at Indianapolis, Indiana, this 12th day of July, A. D. 1889.

WILLIS C. VAJEN. [L. S.]

Witnesses:
C. BRADFORD,
E. W. BRADFORD.